July 4, 1967 FUKUO SHIBATA 3,329,877
SPEED CONTROL CIRCUIT FOR PLURALITY OF INDUCTION MOTORS
Filed April 5, 1962 2 Sheets-Sheet 1

INVENTOR Fukuo Shibata

United States Patent Office 3,329,877
Patented July 4, 1967

3,329,877
SPEED CONTROL CIRCUIT FOR PLURALITY OF INDUCTION MOTORS
Fukuo Shibata, 13 Tokiwa-cho, Nishinomiya, Hyogo Prefecture, Japan
Filed Apr. 5, 1962, Ser. No. 185,787
Claims priority, application Japan, May 20, 1961, 36/18,033
5 Claims. (Cl. 318—44)

My invention relates to electric motor control systems, and it has particular relation to systems for controlling the speed of wound rotor type induction motors by auxiliary direct current motor-generators or other power inverters.

In the control of induction motors by auxiliary direct current motor-generators or other power inverters, it is important to provide control systems by which the induction motors can be controlled over wide speed ranges without sacrificing efficiency of operation, and economy of apparatus of the systems. Heretofore, various arrangements have been devised which permit the control of induction motors by employing auxiliary direct current motors and rectifiers which are electrically connected with the rotors or secondary windings of the main induction motors. Some of these arrangements accomplish the desired speed control, but have necessitated the use of auxiliary apparatus of inordinate proportions relative to the sizes and ratings of the induction motors to be controlled. Therefore, these arrangements become expensive. In addition, in each arrangement of these prior methods, it is necessary to control the voltage of the auxiliary direct current motor by adjusting the shunt field excitation, if the wound rotor induction motor is required to be controlled over a wide speed range. Accordingly, in these cases, the auxiliary direct current motor or the auxiliary power inverter should be provided for each wound rotor induction motor, and these arrangements become expensive.

The object of my invention, generally stated, is to provide control systems affording wide speed ranges for wound rotor induction motors which shall be very simple and efficient in operation and which may be readily and economically manufactured and installed.

The principal object of my invention is to provide an electric control system affording wide speed range for a plurality of wound rotor type induction motors by using a power inverter or an auxiliary direct current motor whose rotor is mechanically coupled to that of a generator and whose terminal voltage is kept constant or approximately constant in a certain speed control range.

The most important object of my invention is to provide a control system by which many wound rotor induction motors can be controlled in speeds different from each other by using a direct current motor generator or a power inverter in common.

Another important object of my invention is to provide a control system by which a plurality of wound rotor induction motors can be controlled to have the same speed by using a direct current motor generator or a power inverter in common.

Still another important object of my invention is to provide a control system by which each wound rotor induction motor can be controlled over a wide speed range by using rectifiers, and an auxiliary direct current motor or a power inverter whose total size and rating are not excessive relative to those of the wound rotor induction motors.

A further object of my invention is to provide a control system by which wound rotor induction motors can be controlled over wide speed ranges by using few, simple and strong apparatus and not by using weak apparatus such as valves with grids.

Other objects of my invention will in part be obvious and in part appear hereinafter.

Accordingly, my invention is disclosed in the embodiments hereof shown in the accompanying drawings and comprises the features of construction, combination of elements and arrangement of parts which will be exemplified in the constructions hereinafter set forth and the scope of the application of which will be indicated in the appended claims.

For a more complete understanding of the nature and scope of my invention, reference may be had to the following detailed description, taken in connection with the accompanying drawing, in which.

Figure 1:
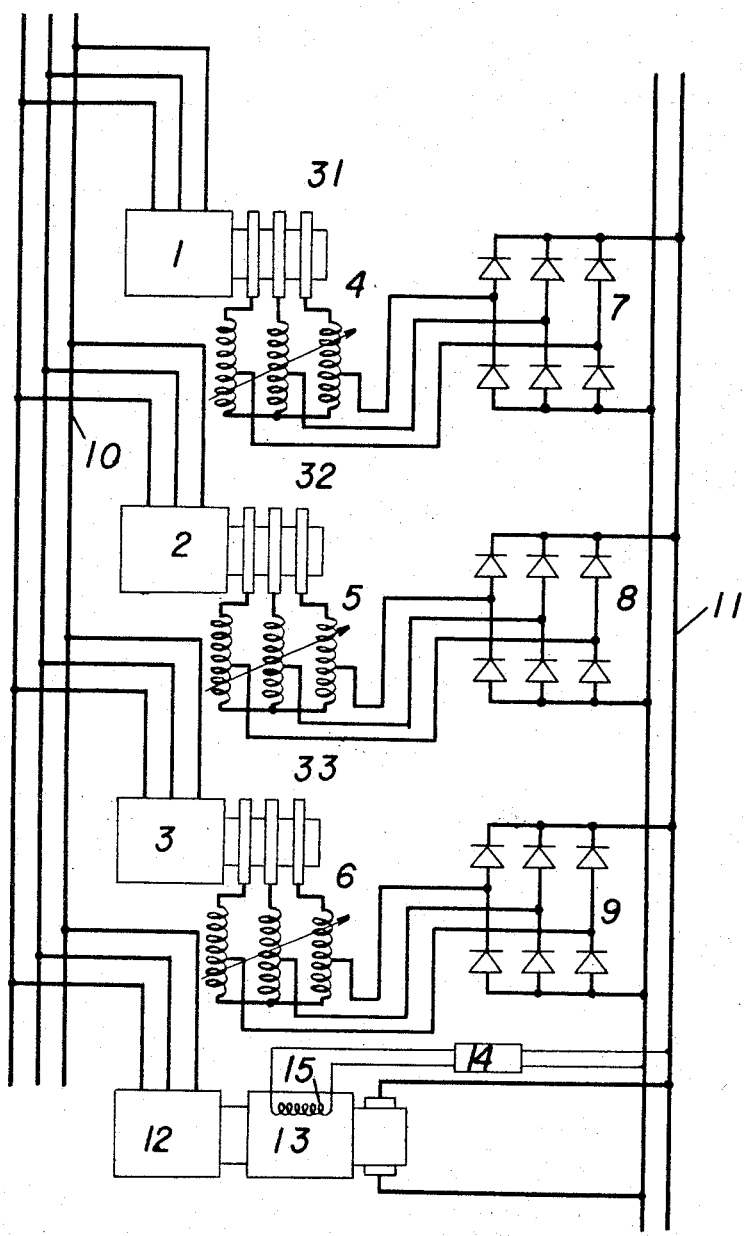
FIG. 1 illustrates diagrammatically one embodiment of my invention.

My invention is in connection with a speed control circuit for a plurality of induction motors having primary windings supplied from an alternating current source and wound secondary windings. An electrical control device for each of said plurality of induction motors is in the output circuit of the secondary winding of each of said plurality of induction motors. Rectifiers are in the output circuit of each of the secondary windings of said plurality of induction motors. Main circuit of an auxiliary power inverter, for example an armature circuit of a direct current motor of a motor generator, main circuit of a mercury inverter etc., is supplied by a direct current bus which is supplied by a direct current output of said rectifiers. The speed of each wound rotor induction motor can be controlled mainly by controlling the said electrical control device. In FIG. 1, primary windings of wound rotor induction motors 1, 2 and 3 are connected to a constant voltage alternating current source 10. Slip-rings 31, 32 and 33 of these wound rotor induction motors 1, 2 and 3 are connected to a direct current bus 11 through each variable ratio transformer 4, 5, 6 and each semiconductor rectifier 7, 8, 9. A direct current bus 11 which is placed between the input terminal 34 of the armature circuit of the direct current motor 13 and each rectifier 7, 8, 9, can be used in common by a plurality of wound rotor induction motors 1, 2 and 3. Thus the armature circuit of the direct current motor 13 is arranged to be able to absorb variable amounts of electric power from the secondary windings of the induction motors 1, 2 and 3. And the direct current motor 13 is mechanically coupled to a synchronous or an asynchronous generator 12 which is electrically connected with the alternating current source 10.

In the arrangement of FIG. 1, the speed of each wound rotor induction motor 1, 2, 3 can be controlled by its respective variable ratio transformer 4, 5, 6, independently. In order that the speed control or the load variation of one induction motor, for example the motor 1, may not influence the speed of the other induction motors 2 and 3, the voltage of the direct current bus 11 should be kept constant. To keep the voltage of the direct current bus 11 constant, the automatic voltage regulator 14 is preferably provided, and connected to the shunt field winding 15 of the direct current motor 13. Resister adjusting type automatic voltage regulator, carbon resistor adjusting type automatic voltage regulator, magnetic amplifier type automatic voltage regulator, Tirril regulator, and many other automatic voltage regulators can be used as the automatic voltage regulator 14. In FIG. 1, the direct current bus 11 or the direct current motor 13 is used in common by a plurality of induction motors 1, 2, 3. Thus, we can say generally that the direct current motor 13 and the direct current bus 11 can be used in common by a plurality of induction motors 1, 2 and 3.

Figure 2:
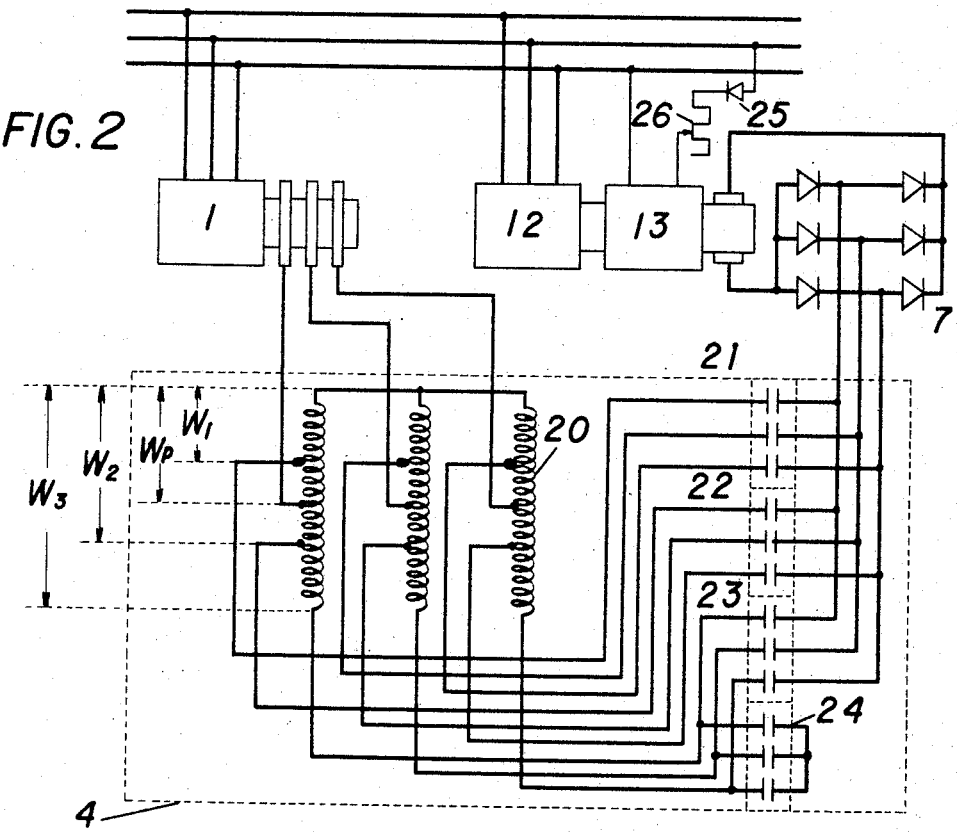
FIG. 2 shows one example of a partial circuit of my invention.

In FIG. 1, the symbols 4, 5 and 6 indicate variable ratio transformers. In FIG. 2, one example of these variable ratio transformers is shown. In FIG. 2, the electric power is supplied from the secondary output terminals of the wound rotor induction motor 1 to the input terminals of the armature circuit of the auxiliary direct current motor 13 through a variable voltage ratio transformer 4 and semiconductor rectifiers 7.

The variable ratio transformer 4 consists of an autotranformer 20 and contactors 21, 22, 23. A contactor 24 is used for short-circuiting of secondary output terminals of the wound rotor induction motor 1, through transformer 20. The primary windings of the autotransformer 20 is shown by a symbol $W_p$, and the number of the winding turns is always constant. The transforming ratio of the autotransformer 20 can be changed by closing the contactor 21, 22 or 23 so connecting respectively the secondary windings $W_1$, $W_2$, $W_3$ of the autotransformer 20. If the number of contactors 21, 22 and 23 is many, the action of the transformer 4 is equivalent to the sliding contact type variable ratio transformer.

In the arrangement of FIG. 2, the speed of the wound rotor induction motor 1 can be controlled by closing and opening the contactors 21, 22, 23 and the secondary windings $W_1$, $W_2$, $W_3$ of the transformer 20. Symbol 25 shows a rectifier for converting from alternating current to direct current. Symbol 26 shows a rheostat. The transformer 4 can be designed so that the transforming ratio U has the values both larger and smaller than one.

There are some prior methods which disclose the speed control of a plurality of induction motors, but there is an important difference between my patent application and these prior methods as follows.

Namely, the secondaries of a plurality of induction motors are connected in parallel to a speed regulating system in these prior methods. On the other hand, in my invention, the secondaries of a plurality of induction motors are connected in parallel to a power inverter, and further each of the secondaries of the plurality of induction motors is respectively connected to the respective speed regulating device such as contactors of each variable ratio transformer. Therefore, in the prior methods, the plurality of induction motors cannot be controlled independently of each other, although these motors can be controlled simultaneously, as only one speed regulating system is used in common by the plurality of induction motors. Namely, in these prior methods, when one induction motor is controlled by the speed regulating system, the other induction motors cannot help being controlled.

On the other hand, in my invention, as an electrical control device is inserted, for each of said plurality of induction motors, in the output circuit of the secondary winding of each of said plurality of induction motors, these plurality of induction motors can be controlled independently of each other.

Being different from that the alternating current circuit of the secondaries of the plurality of induction motors are connected together, there is the special feature of the following combination in my invention. That is: the combination of; an electrical control device, for each of said plurality of induction motors, in the output circuit of the secondary winding of each of said plurality of induction motors; rectifiers in the output circuit of each of the secondary windings of said plurality of induction motors; and a direct current bus which is supplied by the direct current output of said rectifiers.

An important difference between my invention and the prior methods is that there is a direct current bus which is supplied by the direct current output of rectifiers in my invention although there is an alternating current bus in the secondaries of the plurality of induction motors in the prior methods.

Supposing the voltage induced in the secondary windings at a standstill of the wound rotor induction motor is $E_2$, and the voltage on the secondary output terminals of the induction motor at slip S is $E_s$, we can get $$S = E_s/E_2 \quad (1)$$

Figure 3:
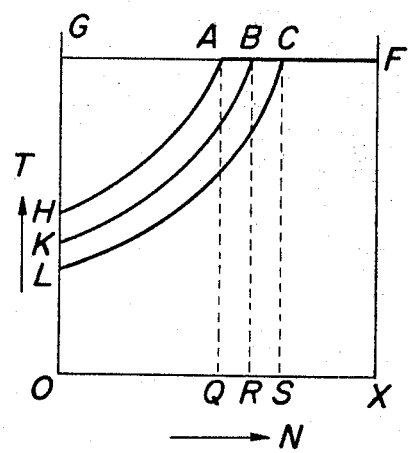
FIG. 3 represents speed-torque characteristics of the arrangement shown in FIG. 2.

In FIG. 1–FIG. 2, adjustable controlling range of the slip S can be largely increased by enlarging the adjustable range of $E_s$ through the controlling of the transforming ratio of the variable ratio transformer, keeping $E_2$ constant. FIG. 3 represents speed-torque characteristics of the arrangement shown in FIG. 1 or FIG. 4. Curves AH, BK, CL of FIG. 3 represent the speed-torque characteristics of the induction motor using different capacities of direct current motors shown in FIG. 1–FIG. 2 in which the transformer ratio control is utilized, keeping the terminal voltage of the auxiliary direct current motor constant at its rating. Curves AF, BF, CF of FIG. 3 represent the speed-torque characteristics of the induction motor using different capacities of direct current motors shown in FIG. 2 in which either the field control of the auxiliary direct current motor or the transformer ratio control can be carried out. Curves FAH, FBK, and FCL are speed-torque characteristics using direct current motors of which output capacities are 50, 40 and 30% of the induction motor capacity, respectively. T and N in FIG. 7 represent respectively torque and speed. FX is 100% torque of the induction motor. OX is 100% synchronous speed of the induction motor. And $$QO = \frac{50}{100}OX \quad RO = \frac{60}{100}OX \quad SO = \frac{70}{100}OX$$

As stated above, the induction motor 1 can be also controlled by adjusting the shunt field excitation of the auxiliary direct current motor 13, when one direct current motor 13 is provided for one induction motor 1. But in the arrangement of my invention shown in FIG. 1 the terminal voltage of the direct current motor 13 is kept approximately constant. In that case, the speed of each wound rotor induction motor is controlled respectively by adjusting the transforming ratio of each transformer 4, 5 or 6. Therefore, in the speed range on the characteristic curve AF, BF or CF of FIG. 3, the induction motor 1, 2, or 3 is also controlled by adjusting the transforming ratio. In FIG. 1, the wound rotor induction motors 1, 2, 3 can be controlled by each transformer 4, 5, 6 in speeds different from each other. In some cases of FIG. 1, wound rotor induction motors can also be so controlled that they are same speed. The sizes and capacities of the induction motors 1, 2, 3 may be same or different from each other.

When the speeds or loads of the wound rotor induction motors are different from each other, the horizontal part of the speed-torque characteristic in FIG. 3 can be enlarged to the direction of AG, even if the capacity of the auxiliary direct current motor is small compared with the total capacity of the wound rotor induction motors. Because, it is rare case that all induction motors are simultaneously loaded with their maximum loads, we can consider a diversity factor of the auxiliary direct current motor for the wound rotor induction motors.

In FIG. 1 or in FIG. 2, when each wound rotor induction motor is required to operate in the comparatively high speed range, we can get satisfactory conditions by adjusting the transforming ratio $U = W_p/W_3$ of each transformer at a low value. When we use an arrangement of the prior method in which the valves with grids or rectifiers with grid action are used without such a transformer as used in my invention, we cannot control the wound rotor induction motor in its high speed range keeping the terminal voltage of the auxiliary direct current motor at its constant.

Until now, we have considered the direct current motor mechanically coupled to a generator as a power inverter.

But in my invention, one can use also a mercury inverter or others as a power inverter. Semiconductor rectifiers with grid action control elements can also be used as rectifiers in the secondary circuit of each wound rotor induction motors.

In the arrangement of my invention, the rated voltage and the current of the auxiliary direct current motor can be designed independently of the rated secondary voltage and the rated secondary current of the wound rotor induction motor, because for instance, the transformer is inserted between the wound rotor induction motor and the auxiliary power inverter or the auxiliary direct current motor. Therefore, a standard type of the auxiliary direct current motor can be used, and the arrangement becomes economical.

In FIG. 2, the numerical relation between the primary winding $W_p$ and the secondary windings $W_1$, $W_2$, $W_3$ is as follows.

$$W_3 > W_2 > W_p > W_1$$

In such an arrangement, the current capacity of the contactor 24 used for short-circuiting the secondary winding of the transformer can be a small one compared with that of the contactor used for short-circiuting the secondary winding of the wound rotor induction motor. This is because the secondary current is smaller than the primary current in such a transformer, as $W_3 > W_p$.

Further, we can say that the transformer ratio $U = W_3/W_p$ and $W_p/W_1$, can be small, in the arrangement of the winding $W_3 > W_p > W_1$, and the size of the transformer becomes economical. Therefore, it is preferable in the transformer that the number of the primary winding turns $W_p$ is smaller than the largest number of the secondary winding turns $W_1$, and is larger than the smallest number of secondary winding turn $W_3$.

When the sliding contact type transformer or the induction regulator is used as a variable ratio transformer, it is not necessary to use contactors such as 21, 22, 23 etc. in FIG. 2. Accordingly, the arrangement becomes very economical. And, in that case, the wound rotor induction motor can be controlled smoothly on the characteristic curve AH, BK, CL of FIG. 3.

In general, capacity of a transformer can be shown by the following equation.

$$m \cdot E \cdot I = m \cdot K \cdot \phi \cdot f \cdot T \cdot I = K \cdot m \cdot \phi \cdot f \cdot AT \quad (2)$$

where $m$ = number of phase
$E$ = primary voltage of one phase
$I$ = primary current of one phase
$\phi$ = magnetic flux
$T$ = number of primary winding of one phase
$AT$ = primary ampere turn of one phase
$f$ = frequency, and
$K$ = constant.

Supposing that the voltage induced in the secondary winding at standstill of the wound rotor induction motor is $E_2$, the frequency of the primary winding of the main induction motor is $f_1$, and the slip is S, the frequency of the primary winding of the transformer will be $S \cdot f_1$, and the voltage applied to the transformer primary winding will be $S \cdot E_2$.

Therefore, from the Equation 2, we can get, $$\phi_2 \cdot AT_2 = \frac{E_2 \cdot I_2}{K \cdot f_1} \quad (3)$$

where $\phi_2 \cdot AT_2$ shows the capacity per phase of the transformer, and $I_2$ is the rating current of the secondary winding of the wound rotor induction motor.

We can get the following equation from the Equation 3.

$$\phi_2 \cdot T = \frac{E_2}{K \cdot f_1} \quad (4)$$

The Equation 4 shows that the voltage applied on the primary winding of the transformer is equivalent to $E_2$, that is the voltage induced on the secondary winding at standstill of the main induction motor, when it is based on the thinking that the applied frequency is always $f_1$ which is the frequency of the primary circuit of the main induction motor.

Accordingly, it follows from this that the magnetic flux $\phi_2$ can be kept constant, and the transformer can be manufactured most economically, if the number T of the primary winding of the transformer 20 in FIG. 2 is constant.

As explained until now, the fundamental features of the arrangement of the applicant's invention are as follows;

(a) This invention is in connection with a speed control circuit for a plurality of induction motors having primary windings supplied from an alternating current source and wound secondary windings.

(b) An electric control device for each of said plurality of induction motors (for example, an electrical control circuit including a plurality of contacts for each of variable ratio autotransformers respectively for each of said plurality of induction motors) is provided in the output circuit of the secondary winding of each of said plurality of induction motors.

(c) Rectifiers are inserted in the output circuit of each of secondary windings of said plurality of induction motors.

(d) There is a direct current bus which is supplied by the direct current output of said rectifiers.

(e) An auxiliary power inverter is provided. Main circuit of the auxiliary power inverter is supplied by said direct current bus, and the A.C. terminals of the power inverter are connected to said alternating current source, whereby said electrical control device controls the speed of said induction motors.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a speed control circuit for a plurality of induction motors having primary windings supplied from an alternating current source and wound secondary windings, in combination:
   an electrical control device, for each of said plurality of induction motors, in the output circuit of the secondary winding of each of said plurality of induction motors;
   rectifiers in the output circuit of each of the secondary windings of said plurality of induction motors;
   a direct current bus which is supplied by the direct currrent output of said rectifiers;
   an auxiliary power inverter whose main circuit is supplied by said direct current bus, and whose A.C. terminals are connected to said alternating current source, whereby said electrical control device controls the speed of said induction motors.

2. In a speed control circuit for a plurality of induction motors having primary windings supplied from an alternating current source and wound secondary windings, in combination:
   an electrical control device, for each of said plurality of induction motors, in the output circuit of the secondary winding of each of said plurality of induction motors;
   rectifiers in the output circuit of each of the secondary windings of said plurality of induction motors;
   a direct current bus which is supplied by the direct current output of said rectifiers;
   an auxiliary direct current motor having an armature circuit supplied by said direct current bus;

and a generator whose rotor is mechanically coupled to the rotor of said auxiliary direct current motor and whose terminals are connected to said alternating current source, whereby said electrical control device controls the speed of said induction motors.

3. In a speed control circuit for a plurality of induction motors having primary windings supplied from an alternating current source and wound secondary windings, in combination:

an electrical control device, for each of said plurality of induction motors, in the output circuit of the secondary winding of each of said plurality of induction motors;

rectifiers in the output circuit of each of the secondary winding of said plurality of induction motors;

a direct current bus which is supplied by the direct current output of said rectifiers;

an auxiliary direct current motor having an armature circuit supplied by said direct current bus;

an automatic voltage regulator adjusting the shunt field current of said auxiliary direct current motor;

and a generator whose rotor is mechanically coupled to the rotor of said auxiliary direct current motor and whose terminals are connected to said alternating current source, whereby said electrical control device controls the speed of said induction motors.

4. In a speed control circuit for a plurality of induction motors having primary windings supplied from an alternating current source and wound secondary windings, in combination:

a variable ratio transformer in the output circuit of the secondary winding of each of said plurality of induction motors;

an electric control circuit for each of said variable ratio transformers;

rectifiers in the output circuit of each of said variable ratio transformers for converting the alternating current output from each of said variable ratio transformers to direct current;

a direct current bus which is supplied by the direct current output of said rectifiers;

an auxiliary direct current motor having an armature circuit supplied by said direct current bus;

an automatic voltage regulator adjusting the shunt field current of said auxiliary direct current motor;

and a generator whose rotor is mechanically coupled to the rotor of said auxiliary direct current motor and whose terminals are connected to said alternating current source, whereby said electrical control circuits regulate the transforming ratio of said variable ratio transformers.

5. In a speed control circuit for a plurality of induction motors having primary windings supplied from an alternating current source and wound secondary windings, in combination:

a variable ratio autotransformer in the output circuit of the secondary winding of each of said plurality of induction motors;

an electrical control circuit including a plurality of contacts for each of said variable ratio autotransformers;

rectifiers in the output circuit of each of said variable ratio autotransformers for converting the alternating current output from each of said variable ratio autotransformers to direct current;

a direct current bus which is supplied by the direct current output of said rectifiers;

an auxiliary direct current motor having an armature circuit supplied by said direct current bus;

and a generator whose rotor is mechanically coupled to the rotor of said auxiliary direct current motor and whose terminals are connected to said alternating current source, whereby said electrical control circuits regulate the transforming ratio of said variable ratio autotransformers.

References Cited

UNITED STATES PATENTS

| | | | |
|---|---|---|---|
| 2,087,782 | 7/1937 | Rossman | 318—44 |
| 2,885,615 | 5/1959 | De La Bretoniere | 318—44 |
| 3,231,805 | 1/1966 | Shibata | 318—238 |

FOREIGN PATENTS 123,312   11/1927   Switzerland.

OTHER REFERENCES

German printed application (Orth) B33082 VIII b/21c, Aug. 2, 1956 (1 Sht. Dwg., 1 pp. spec.)

C. E. ROHRER, G. Z. RUBINSON, *Assistant Examiners.*

ORIS L. RADER, *Primary Examiner.*